July 3, 1923.
E. NEWNHAM
OVERLOAD PROTECTIVE DEVICE FOR ELECTRIC MOTORS
Filed April 10, 1922
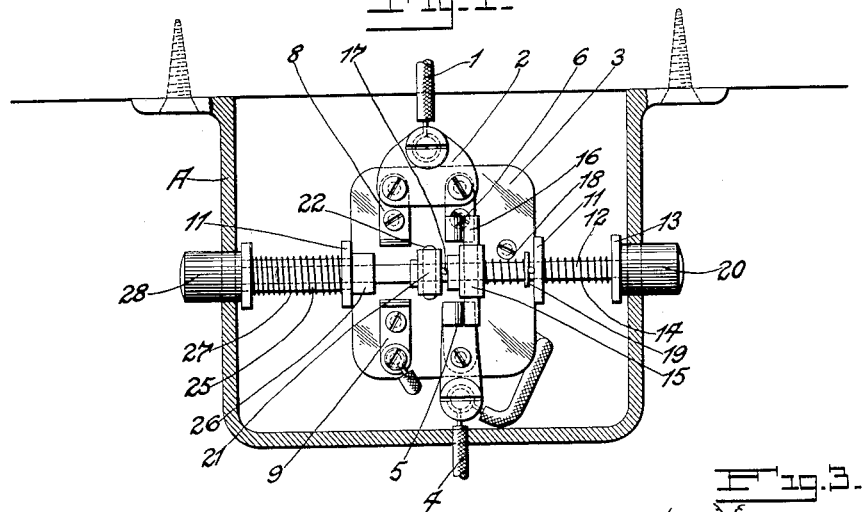
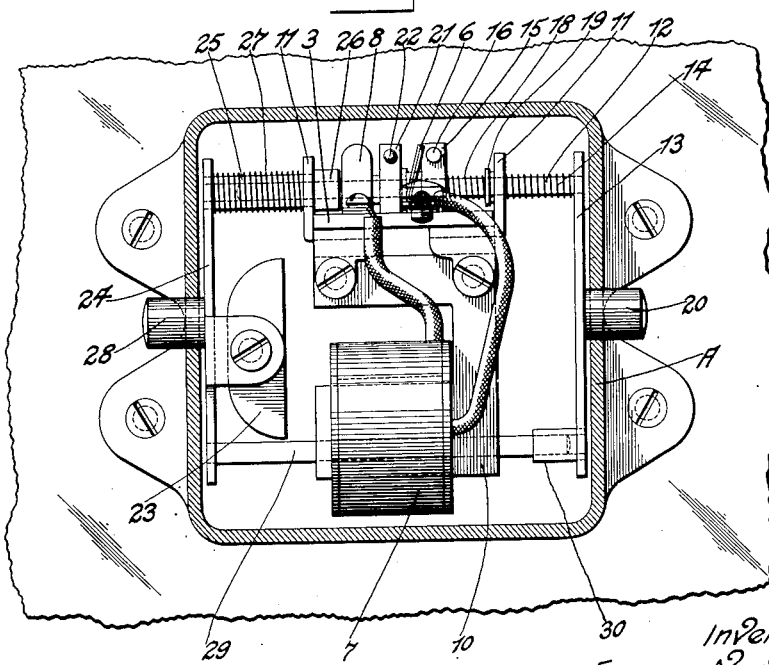
Inventor:
Eugene Newnham,
by Rippey & Kingsland,
His Attorneys.

Patented July 3, 1923.

1,460,556

UNITED STATES PATENT OFFICE.

EUGENE NEWNHAM, OF ST. LOUIS, MISSOURI.

OVERLOAD PROTECTIVE DEVICE FOR ELECTRIC MOTORS.

Application filed April 10, 1922. Serial No. 551,234.

*To all whom it may concern:*

Be it known that I, EUGENE NEWNHAM, a citizen of the United States, residing at St. Louis, Missouri, have invented a new and useful Overload Protective Device for Electric Motors, of which the following is a specification.

This invention relates to an overload protective device for electric motors.

An object of the invention is to provide an improved device for controlling the electrical energy utilized in the operation of an electric motor in order to cause a current of high voltage to pass direct to the motor when starting the motor, and to control the effect of the electrical energy to stop the motor in case of an overload.

Another object of the invention is to provide a device of the character mentioned with means for opening the circuit to stop the motor automatically and as an incident to an overload on the motor.

Another object of the invention is to provide a device of the character mentioned with means for connecting the line voltage direct to the motor in order to utilize the high voltage in starting the motor, and means for opening the circuit to stop the motor automatically and as an incident to the placing of an overload on the motor.

Another object of the invention is to provide a device of the character mentioned embodying means for connecting the line voltage direct to the motor for starting purposes, and for causing the current to pass direct to the motor so there will not be a drop in the voltage during the starting of the motor, and means for opening the circuit to stop the motor automatically and as an incident to the placing of an overload on the motor.

Other objects will appear from the following description, reference being made to the drawing, in which—

Fig. 1 is an elevation of one embodiment of the invention.

Fig. 2 is a plan view thereof.

Fig. 3 is a diagrammatic view showing the device in an electric circuit.

In the simple and efficient form of the invention shown, a line wire 1 from a source of electrical energy is connected to a part 2 mounted on an insulation support 3. The principal operative parts of the device are shown as enclosed within a supporting and protecting case A.

A wire 4 leads from a contact member 5 on the support 3 to the motor. A contact member 6 on the part 2 is out of direct communication with the contact member 5. Provision is made for closing the gap between the contact members 5 and 6 to complete the circuit direct to the motor to utilize high voltage current in starting the motor, and at the same time, to complete the circuit to a magnet coil 7 that is in circuit with the wire 4. A resilient contact member 8 in connection with the part 2 is in spaced relationship to a contact member 9 on the support 3 which is also in circuit with the magnet coil 7.

The invention comprises means for controlling and utilizing the electric current to pass the current direct to the motor in starting the motor, and then passing the current through the magnet coil 7 for subsequent operation of the motor, and thereafter opening the circuit automatically and as an incident to an overload on the motor.

The core 10 of the magnet coil 7 supports a bracket 11 in which a rod 12 is mounted for axial movements. One end of the rod 12 is connected to a lever 13 and a coiled spring 14 encircles the rod 12 between said lever 13 and the adjacent portion of the bracket 11, the energy of said spring being exerted to actuate the rod 12 outwardly to the position shown. An insulation block 15 is movable on the rod 12 and carries a part 16 adapted to make contact with the contact members 5 and 6 to close the gap and complete the circuit between them when the rod 12 is actuated inwardly in opposition to the power of the spring 14. An abutment 17 against which the block is yieldingly pressed by a spring 18 holds the part 16 out of contact with the contact members 5 and 6 when the rod 12 is in its outward position. The spring 18 encircles the rod 12, having its inner end bearing against the insulation block 16 and its outer end against an abutment 19 attached to and moving with the rod 12 and serving also to limit outward movement of the rod 12 by contact with the bracket 11. Obviously, the rod 12 may be operated to move the part 16 to position to close the gap between the contact members 5 and 6 and thereby complete the circuit direct to the motor without causing the current to pass through the magnet coils. For convenience in operation the lever 13 may be equipped with a push button 20.

An insulation block 21 is mounted for sliding movements upon the rod 12 and is crossed by a metallic element 22 adapted to contact with the resilient ends of the contact members 8 and 9 to close the gap between them and complete the circuit through the magnet coils 7 to the motor after the direct circuit to the motor has been opened. As shown, the block 21 is engaged by the abutment 17 and is thereby moved to position between the resilient ends of the contact members 8 and 9 when the rod 12 is pressed inwardly in opposition to the power of the spring 14. The ends of the metallic element 22 will be yieldingly engaged by the resilient ends of the contact members 8 and 9 and retained in position between said contact members when the rod 12 is moved outwardly to open the direct circuit to the motor across the contact members 5 and 6. Thus it will be seen that in starting the motor the line voltage is applied direct to the motor to utilize all of the current. After the initial torque of the motor has been overcome and the motor has been started by the direct current, the circuit between the contact members 5 and 6 is opened and the current is passed through the magnet coils and thence to the motor.

As stated, the invention also comprises means for opening the circuit to stop the motor automatically and as an incident to an overloading of the motor. When the motor is overloaded the core 10 of the magnet coils becomes magnetically energized sufficiently to operate an actuator to open the circuit by moving the connector from between the contact members 8 and 9. In the embodiment of the invention shown the actuator comprises an armature 23 supported by a lever 24 secured to a sleeve 25, enclosing one end of the rod 12 and leaving the sleeve and the rod capable of independent movement. The sleeve 25 is slidable through one of the arms of the bracket 11, outward axial movement of the sleeve being limited by an enlargement 26 thereon at the inner side of the bracket arm. The lever 24 and the parts connected therewith are actuated outwardly and are yieldingly retained in their outward positions by a spring 27 encircling the sleeve 25 and having its inner end bearing against the lever 24. The relationship of the parts is such that when the armature 23 is moved by the energy of the electromagnet the inner end of the sleeve 25 contacts with and moves the block 21 from between the contact members 8 and 9, thereby breaking the circuit. The circuit is thus broken or opened and the motor is stopped automatically and as an incident to the placing of an overload on the motor.

The circuit may also be opened optionally for which purpose a push button 28 is provided for operating the lever 24.

Proper relationship of the levers 13 and 24 may be maintained, as shown, by a rod 29 having one end attached to the lever 24 and the opposite end operating within a sleeve 30 attached to the lever 13.

From the foregoing it will be seen that my invention accomplishes all of its intended objects and purposes in a highly efficient manner. The embodiment of the invention chosen for illustration is extremely simple and may be varied in numerous particulars without departure from the nature and principle of the invention.

I do not restrict myself to the form of the invention shown and described, nor unessentially in any particulars, but contemplate such variations as may be found desirable to adapt the invention to the uses for which it is intended.

What I claim and desire to secure by Letters Patent is:—

1. In a device of the class described, the combination of an electric circuit having a magnet coil therein, a second circuit leading directly to the apparatus to be operated, contact members for closing each of said circuits, an actuator for moving one of said contact members to close the circuit leading direct to the apparatus and for moving the other contact member to close the second circuit after the first named circuit is closed, and automatic means for releasing the first contact member after the circuit including the magnetic coil has been closed.

2. In a device of the class described, the combination of an electric circuit having a magnet coil therein, a second circuit leading directly to the apparatus to be operated, contact members for closing each of said circuits, an actuator for moving one of said contact members to close the circuit leading direct to the apparatus and for moving the other contact member to close the second circuit after the first named circuit is closed, automatic means for releasing the first contact member after the circuit including the magnet coil has been closed, and automatic means operable by the magnet coil for opening the circuit including the magnet coil when the voltage applied to said coil exceeds a predetermined limit.

3. In a device of the class described, the combination of an electric circuit having a magnet coil therein, a second circuit leading directly to the apparatus to be operated, contact members for closing each of said circuits, an actuator for moving one of said contact members to close the circuit leading direct to the apparatus and for moving the other contact member to close the second circuit after the first named circuit is closed, automatic means for releasing the first contact member after the circuit including the magnet coil has been closed, automatic means operable by the magnet coil for opening the circuit including the magnet coil when the voltage applied to said coil exceeds a predetermined limit, and manual means for opening the circuit through the magnet coil.

4. In a device of the class described, a support, a double pair of terminal members, one pair of said terminal members being for a circuit direct to the apparatus to be operated and the other pair of said terminal members being for a circuit to the apparatus to be operated through a magnet coil, a push rod, contact members carried by said push rod and arranged to close the circuit between each pair of terminal members, said contact members being arranged so that the circuit direct to the apparatus to be operated is first closed and upon further movement of said rod the circuit through said magnet coil is closed, and automatic means for opening the circuit direct to the apparatus to be operated after the circuit through the magnet coil has been closed.

5. In a device of the class described, a support, a double pair of terminal members, one pair of said terminal members being for a circuit direct to the apparatus to be operated and the other pair of said terminal members being for a circuit to the apparatus to be operated through a magnet coil, a push rod, contact members carried by said push rod and arranged to close the circuit between each pair of terminal members, said contact members being arranged so that the circuit direct to the apparatus to be operated is first closed and upon further movement of said rod the circuit through said magnet coil is closed, automatic means for opening the circuit direct to the apparatus to be operated after the circuit through the magnet coil has been closed, and automatic means operable by the magnet coil for opening the circuit including the magnet coil when the voltage applied to said coil exceeds a predetermined limit.

6. In a device of the class described, a support, a double pair of terminal members, one pair of said terminal members being for a circuit direct to the apparatus to be operated and the other pair of said terminal members being for a circuit to the apparatus to be operated through a magnet coil, a push rod, contact members carried by said push rod and arranged to close the circut between each pair of terminal members, said contact members being arranged so that the circuit direct to the apparatus to be operated is first closed and upon further movement of said rod the circuit through said magnet coil is closed, automatic means for opening the circuit direct to the apparatus to be operated after the circuit through the magnet coil has been closed, and manual means for opening the circuit through the magnet coil.

7. In a device of the class described, a magnetic circuit breaker adapted to open the circuit when an overload voltage is applied to the magnet, terminal members for said circuit, a main circuit to the apparatus to be operated, terminal members for said main circuit, contact devices for closing the circuit across said terminal members, a common actuator for said contact devices, said actuator being operable to first close the common circuit and upon further movement thereof to close the circuit through the magnetic circuit breaker, and a spring device for automatically opening the circuit between the terminals of the main circuit after the actuator has been released.

8. In a device of the class described, a circuit breaker including a magnet coil adapted to open the circuit when an overload voltage is applied to the magnet, terminal members for said circuit, a main circuit to the apparatus to be operated, terminal members for said main circuit, contact devices for closing the circuit across said terminal members, a common actuator for said contact devices, said actuator being operable to first close the common circuit and upon further movement thereof to close the circuit through the circuit breaker, a spring device for automatically opening the circuit between the terminals of the main circuit after the actuator has been released, and automatic means operable by the magnet coil for opening the circuit breaker when the voltage applied to said coil exceeds a predetermined limit.

9. In a device of the class described, a circuit breaker including a magnet coil adapted to open the circuit when an overload voltage is applied to the magnet, terminal members for said circuit, a main circuit to the apparatus to be operated, terminal members for said main circuit, contact devices for closing the circuit across said terminal members, a common actuator for said contact devices, said actuator being operable to first close the common circuit and upon further movement thereof to close the circuit through the circuit breaker, a spring device for automatically opening the circuit between the terminals of the main circuit after the actuator has been released, and manual means for opening the circuit through the magnet coil.

10. In a device of the class described, an electric circuit for applying a starting current to a motor, said circuit having spaced terminal members, a second circuit including a magnet coil having spaced terminal members, a rod disposed between said terminal members, electrical contact members carried by said rod, said contact members being arranged upon movement of the rod so that the first circuit is closed upon the initial movement of the rod and the second circuit is closed upon further movement of the rod, and a release device for releasing said first contact member to open the circuit direct to the motor while the second circuit remains closed.

11. In a device of the class described, an electric circuit for applying a starting current to a motor, said circuit having spaced terminal members, a second circuit including a magnet coil having spaced terminal members, a rod disposed between said terminal members, electrical contact members carried by said rod, said contact members being arranged upon movement of the rod so that the first circuit is closed upon the initial movement of the rod and the second circuit is closed upon further movement of the rod, a release device for releasing said first contact member to open the circuit direct to the motor while the second circuit remains closed, and automatic means operable by the magnet coil for opening the circuit including the magnet coil when the voltage applied to said coil exceeds a predetermined limit.

12. In a device of the class described, an electric circuit for applying a starting current to a motor, said circuit having spaced terminal members, a second circuit including a magnet coil having spaced terminal members, a rod disposed between said terminal members, electrical contact members carried by said rod, said contact members being arranged upon movement of the rod so that the first circuit is closed upon the initial movement of the rod and the second circuit is closed upon further movement of the rod, a release device for releasing said first contact member to open the circuit direct to the motor while the second circuit remains closed, and manual means for opening the circuit through the magnet coil.

EUGENE NEWNHAM.